United States Patent [19]
Monereau et al.

[11] Patent Number: 5,961,694
[45] Date of Patent: Oct. 5, 1999

[54] APPARATUS AND PROCESS FOR THE SEPARATION OF GAS MIXTURES BY PRESSURE SWING ADSORPTION

[75] Inventors: Christian Monereau; Nathalie Derive, both of Paris; Pierre Petit, Verrières le Buisson, all of France

[73] Assignee: L'Air Liquide, Societe Anonyme pour l'Etude et l'Exploitation des Procedes Georges Claude, Paris Cedex, France

[21] Appl. No.: 09/085,003

[22] Filed: May 28, 1998

[30] Foreign Application Priority Data

Jun. 9, 1997 [FR] France ................................ 97 07116

[51] Int. Cl.⁶ .................................................. B01D 53/053
[52] U.S. Cl. .................................. 95/98; 95/105; 95/130; 96/130; 96/144
[58] Field of Search ................................ 95/96–105, 130; 96/108, 130, 143, 144

[56] References Cited

U.S. PATENT DOCUMENTS

| | | | |
|---|---|---|---|
| 3,142,547 | 7/1964 | Marsh et al. | 95/100 |
| 3,788,036 | 1/1974 | Lee et al. | 95/101 |
| 4,160,651 | 7/1979 | Pivard | 95/97 |
| 4,468,237 | 8/1984 | Fuderer | 95/100 |
| 4,512,779 | 4/1985 | Hay | 95/100 |
| 4,561,865 | 12/1985 | McCombs et al. | 95/96 |
| 4,816,039 | 3/1989 | Krishnamurthy et al. | 95/97 |
| 4,917,710 | 4/1990 | Haruna et al. | 95/130 X |
| 5,032,150 | 7/1991 | Knaebel | 95/98 X |
| 5,254,154 | 10/1993 | Gauthier et al. | 95/100 X |
| 5,370,728 | 12/1994 | LaSala et al. | 95/101 |
| 5,505,765 | 4/1996 | Kaji et al. | 95/100 |
| 5,518,526 | 5/1996 | Baksh et al. | 95/101 X |
| 5,565,018 | 10/1996 | Baksh et al. | 95/100 |
| 5,620,501 | 4/1997 | Tamhankar et al. | 95/96 X |
| 5,658,371 | 8/1997 | Smolarek et al. | 95/101 |
| 5,679,134 | 10/1997 | Brugerolle et al. | 95/96 |
| 5,702,504 | 12/1997 | Schaub et al. | 95/101 |
| 5,772,737 | 6/1998 | Andreani et al. | 95/101 X |
| 5,871,565 | 2/1999 | Leavitt | 95/100 |

FOREIGN PATENT DOCUMENTS 0 513 746   11/1992   European Pat. Off. .
0 743 087   11/1996   European Pat. Off. .

*Primary Examiner*—Robert Spitzer
*Attorney, Agent, or Firm*—Young & Thompson

[57] ABSTRACT

The apparatus for the separation of a gas mixture by pressure swing adsorption (PSA) comprises at least one adsorber A and a first vessel T which can be selectively connected to the adsorber in order temporarily to store the gas which is extracted from the adsorber and reintroduced into it during a cycle, the vessel T having a fixed free internal volume V, a vertical main direction of height h, with the relationship $25 \leq h^3/V \leq 150$, and the gas fraction entering and leaving the vessel T at its lower part, and remaining therein for a time which does not exceed 300 seconds. The apparatus is useful in the production of oxygen or hydrogen.

11 Claims, 1 Drawing Sheet

APPARATUS AND PROCESS FOR THE SEPARATION OF GAS MIXTURES BY PRESSURE SWING ADSORPTION

FIELD OF THE INVENTION

The present invention relates to apparatus for the separation of gas mixtures by pressure swing adsorption (PSA), of the type comprising at least one adsorber and at least a first vessel which can be selectively connected to the adsorber, via at least a first line, in order temporarily to store a gas fraction which is extracted from the adsorber and reintroduced into it during a cycle.

BACKGROUND OF THE INVENTION

A large number of PSA cycles used for the separation of a composite gas mixture comprise an elution step and/or a recompression step using a gas fraction enriched with respect to the least adsorbable constituent of the initial gas flow extracted from the adsorber during a depressurization step. Examples are found, for example for the production of hydrogen, in the document U.S. Pat. No. 4,512,779 or, for the production of oxygen, in the document EP-A-0,743,087, both being in the name of the Applicant Company. Since the gas fraction used for elution and/or recompression is produced with a composition that is progressively less and less rich with respect to the least adsorbable constituent during the abovementioned decompression step, it is advantageous to store this fraction in a reservoir, making it possible to maintain the corresponding composition gradient in order subsequently to reinject the gas fraction into the adsorbent, this time with increasing purity. Examples of longitudinal-segregation vessels are described, for example, in the documents U.S. Pat. No. 4,512,779, which was mentioned above, EP-A-0,513,746 (Toyo) or U.S. Pat. No. 5,565,018 (Praxair). These documents describe intricate or expensive reservoir structures, with internal linings and/or dimensions which cannot be used on an industrial scale.

SUMMARY OF THE INVENTION

The object of the present invention is to provide a separation apparatus which, in an arrangement which is simple, robust and inexpensive to manufacture, makes it possible to obtain improved performance, at least equivalent to that obtained with the vessel architectures described in the documents in the paragraph above.

To this end, according to one characteristic of the invention, the first vessel has a fixed free internal volume (V) and a vertical main direction and height (h) such that $25 \leq h^3/V \leq 150$, the first line communicating with the lower part of the vessel.

According to a more particular characteristic of the invention, the first vessel is cylindrical and has a diameter (d), with $4.5 \leq h/d \leq 10$.

The present invention also relates to a PSA separation process employing an apparatus of this type, comprising, in sequence, a production phase, a regeneration/elution phase and a recompression phase, in which the storage time of the gas fraction in the first vessel does not exceed 300 seconds, and is typically less than 200 seconds.

BRIEF DESCRIPTION OF THE DRAWINGS

Other characteristics and advantages of the present invention will emerge from the following description of embodiments, which is given by way of illustration but without implying any limitation, and with reference to the appended drawings, in which.

DETAILED DESCRIPTION OF THE INVENTION

In the following description relating to the drawings, identical or similar elements are identified by the same reference numbers, where appropriate indexed.

Figure 1:
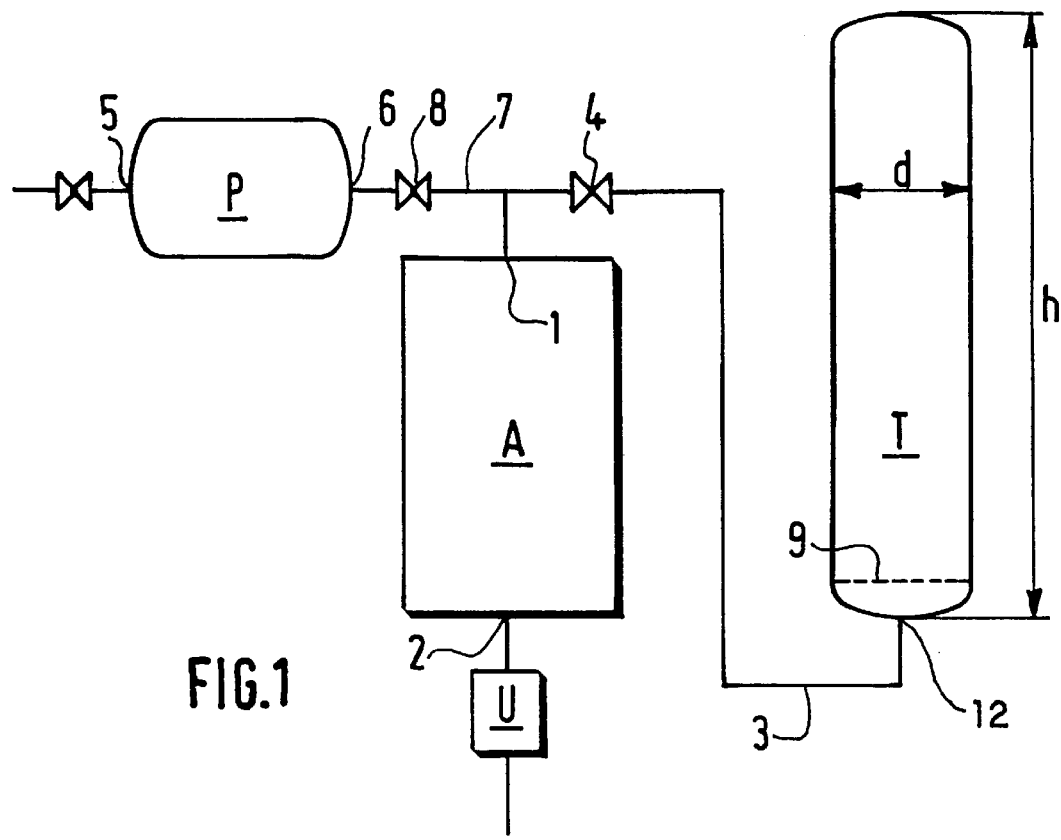
FIG. 1 is a schematic view of a single-adsorber PSA apparatus according to the invention.

FIG. 1 shows a PSA separation apparatus for the production of oxygen from air, of the type described in the document EP-A-0,743,087 which was mentioned above, and essentially comprising a single adsorber A, a production gas vessel P and a cycle vessel T, which can be connected respectively to the outlet 1 of the adsorber A, the inlet 2 of which is connected to a compression/sucking unit u with bypass valves, as described in the document U.S. Pat. No. 4,561,865, or with a reversible rotating machine, as described in EP-A-0,743,087 which was mentioned above. The cycle vessel T defines an unpartitioned single internal volume and has, typically at its lower end, a single access port 12 via which it is connected to the outlet 1 of the adsorber by a line 3 which includes a shut-off valve 4. The production gas vessel P has an outlet port 5 which can be connected to a user circuit, and an inlet port 6 which is connected to the outlet 1 of the adsorber A via a line 7 which includes a valve 8.

According to one aspect of the invention, the vessel T has a vertical main direction with a height h, the line 3 connecting with the vessel T at the lower end of the latter. Typically, as represented in the figures, the vessel T has a cylindrical shape with a diameter d. According to the invention, the vessel T defines a fixed internal volume V, which is for the most part free and advantageously completely free, that is to say without partitions, linings or internal particulate materials. The height h is correlated with the internal volume V such that $25 \leq h^3/V \leq 150$, advantageously with $25 \leq h^3/d \leq 120$, and preferably with $35 \leq h^3/V \leq 100$. For cylindrical vessels T, these dimensions result, to first approximation, in a ratio h/d of between 4.5 and 10, advantageously between 5 and 8.

With an arrangement of this type, the segregation effect in the vessel T is obtained naturally: at each instant, the gas introduced through the bottom into the constant closed volume V of the vessel T causes the gas already contained in it to undergo adiabatic-type compression and to heat up. A temperature gradient is thus created, with the temperatures increasing from the bottom upwards, and this stabilizes the volume of gas contained in the reservoir, with the gas which is hottest, and therefore lightest, being found in the upper part. This effect of temperature on the density of the gases is substantially more pronounced than the effect, which may be in the reverse sense, of the albeit relatively limited variation in composition of the gas fraction. It will be noted that, during discharge, the residual gas in the vessel T undergoes the reverse adiabatic decompression, and returns to the initial temperature.

The seqreqation effect is commensurately stronger as the storage time in the reservoir is short, so as to minimize internal and external heat exchange and diffusion within the volume of gas. According to one aspect of the invention, the storage time of the gas fraction in the vessel T should not exceed 300 seconds, and is advantageously less than 200 seconds, typically less than 180 seconds.

As a variant, the lower part of the vessel T advantageously comprises, in line with the port 11, a transverse perforated sheet or plate 9, optionally having sections with perforations that differ between the central and peripheral regions.

The device in FIG. 1 is typically employed with a cycle which comprises a production phase followed by a regeneration/elution phase, itself followed by a repressurization phase, immediately after which there is a new production phase with increasing pressure.

During the production phase, the valve 4 is closed and the least adsorbable fraction of the gas mixture passing through the adsorber A travels into and through the production gas vessel P.

At the end of the production phase, the valve 8 is closed and the valve 4 is opened for a phase of depressurizing the adsorber A at least in cocurrent, with the pressurized gas fraction in the upper part of the adsorber A entering the lower part of the vessel T.

Following this initial depressurization phase, the valve 4 is closed and the inlet 2 of the adsorber is evacuated for a phase of countercurrent depressurization to the low pressure of the cycle, which may comprise a final phase of elution at the low pressure of the cycle using gas originating from the vessel T, with the valve 4 then being open (and the valve 8 remaining closed).

The recompression phase includes an initial repressurization step using gas from the vessel T, for example followed by an intermediate repressurization step using production gas from the vessel P.

Figure 2:
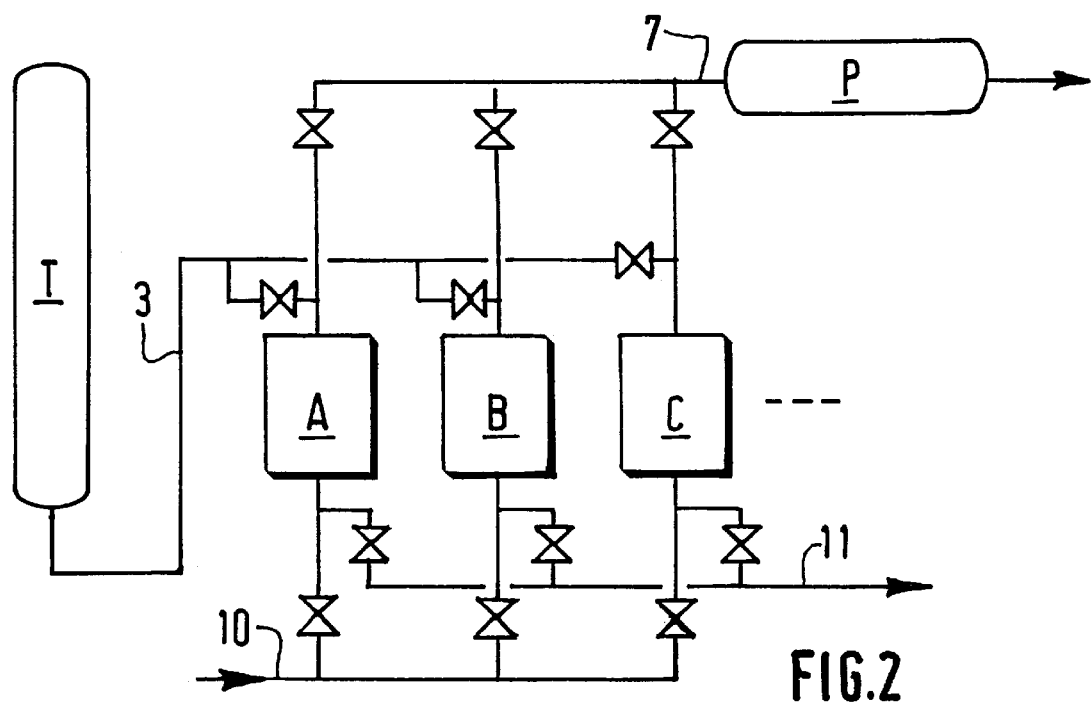
FIG. 2 is a schematic view of a multi-adsorber PSA apparatus according to the invention.

FIG. 2 represents a PSA apparatus which is suitable for the production of hydrogen and comprises at least three adsorbers A, B, C, the outlets of which can be connected individually to the vessels T and P, and the inlets of which can be connected individually to a line 10 for supplying gas mixture, and to a line 11 for extracting the desorbed gas fraction.

In the embodiment in FIG. 2, the vessel T is used only for the elution stops of the various adsorbers.

Although the present invention has been described with reference to particular embodiments, it is in no way limited thereby and, on the contrary, may receive modifications and variants which will occur to the person skilled in the art. In particular, the apparatus may include two adsorbers which share a common first vessel T and a common second vessel P.

We claim:

1. PSA separation process employing an apparatus having at least one adsorber and at least a first vessel which can be selectively connected to the adsorber, via at least a first line, in order temporarily to store a gas fraction which is extracted from the adsorber and reintroduced into it during a cycle, the first vessel having a fixed free internal volume and a vertical main direction with a height h such that $25 \leq h^3/V \leq 150$, the first line communicating with the lower part of the first vessel, the process comprising, in sequence, a production phase, a regeneration/elution phase and a recompression phase, with the storage time of the gas fraction in the first vessel not exceeding 300 seconds.

2. Process according to claim 1, in which the storage time of the gas fraction in the first vessel does not exceed 200 seconds.

3. Process according to claim 1, in which the regeneration phase includes at least one initial depressurization step, during which a gas fraction leaving the adsorber is sent to the first vessel.

4. Process according to claim 1, in which the regeneration phase comprises a final elution step, during which the gas fraction in the first vessel is sent in counter-current into the adsorber.

5. Process according to claim 1, in which the repressurization phase includes an initial repressurization step, during which the gas fraction in the first vessel is sent to the adsorber.

6. Process according to claim 1, for the production of hydrogen from a gas mixture comprising hydrogen.

7. Process according to claim 1, for the production of oxygen from air.

8. Apparatus for the separation of a gas mixture by pressure swing adsorption, comprising at least one adsorber and at least a first vessel which can be selectively connected to the adsorber, via at least a first line, in order temporarily to store a gas fraction which is extracted from the adsorber and reintroduced into it during a cycle, wherein the first vessel has a fixed free internal volume and a vertical main direction with a height h such that $25 \leq h^3/V \leq 150$, the first line communicating with the lower part of the first vessel.

9. Apparatus according to claim 8, wherein the first vessel is cylindrical and has a diameter d, with $4.5 \leq h/d \leq 10$.

10. Apparatus according to claim 8, wherein the first vessel has a single access port.

11. Apparatus according to claim 8, wherein it comprises a second vessel which can be selectively connected to the adsorber via at least a second line, in order at least temporarily to store a production gas fraction.

* * * * *